US011970025B2

(12) United States Patent
Blanco Barrera

(10) Patent No.: US 11,970,025 B2
(45) Date of Patent: Apr. 30, 2024

(54) SAFETY DEVICE FOR A VEHICLE ROLLING DEVICE

(71) Applicant: Guadalupe Gildardo Blanco Barrera, Puebla (MX)

(72) Inventor: Guadalupe Gildardo Blanco Barrera, Puebla (MX)

(*) Notice: Subject to any disclaimer, the term of this patent is extended or adjusted under 35 U.S.C. 154(b) by 1206 days.

(21) Appl. No.: 16/485,268

(22) PCT Filed: May 21, 2019

(86) PCT No.: PCT/MX2019/000061
§ 371 (c)(1),
(2) Date: Aug. 12, 2019

(87) PCT Pub. No.: WO2020/226479
PCT Pub. Date: Nov. 12, 2020

(65) Prior Publication Data
US 2021/0331516 A1      Oct. 28, 2021

(30) Foreign Application Priority Data

May 8, 2019 (MX) .................... MX/a/2019/005377

(51) Int. Cl.
*B60B 7/16* (2006.01)
*B60B 7/06* (2006.01)
*F16B 41/00* (2006.01)

(52) U.S. Cl.
CPC .............. *B60B 7/16* (2013.01); *B60B 7/068* (2013.01); *F16B 41/005* (2013.01); *B60B 2900/3318* (2013.01); *B60B 2900/5112* (2013.01); *B60B 2900/5114* (2013.01)

(58) Field of Classification Search
CPC ... B60B 7/16; B60B 7/068; B60B 2900/3318; B60B 2900/5112; B60B 2900/5114; F16B 41/005; Y10T 70/5562; Y10T 70/5575
USPC .......................................... 70/163
See application file for complete search history.

(56) References Cited

U.S. PATENT DOCUMENTS

| 2,684,710 A | 7/1954 | Claude |
| 3,241,408 A | 3/1966 | Lewis |
| 3,874,258 A | 4/1975 | Semola et al. |
| 4,046,184 A | 9/1977 | Diehl |
| 4,602,903 A * | 7/1986 | Wilburn ............... F16B 41/005 411/222 |
| 4,671,141 A | 6/1987 | Hanson |

(Continued)

FOREIGN PATENT DOCUMENTS

| AU | 685937 | 1/1998 |
| CA | 2172570 | 9/1997 |

(Continued)

*Primary Examiner* — Suzanne L Barrett
(74) *Attorney, Agent, or Firm* — Defillo & Associates, Inc.; Evelyn A. Defillo

(57) ABSTRACT

The present invention refers to a security device for a vehicle bearing device. (1), which is manufactured in order to increase the level of safety for the prevention of removal of a rolling medium of a motor vehicle as it can be a compact, medium-sized vehicle, pick-up, among other segments of vehicles and that includes a fixing unit (100), a mechanism for closing and opening (200), which inside has a combination core (300) which in turn has a configuration with synchrony and unique combination to obtain the opening thereof.

5 Claims, 16 Drawing Sheets

(56) References Cited

U.S. PATENT DOCUMENTS

| | | |
|---|---|---|
| 4,734,001 A | 3/1988 | Bennett |
| 4,747,202 A | 5/1988 | Beals |
| 4,938,108 A * | 7/1990 | Mekler ................. B25B 13/485 411/407 |
| 5,020,949 A | 6/1991 | Davidson |
| 5,238,342 A | 8/1993 | Stencel |
| 5,449,260 A | 9/1995 | Whittle |
| 5,533,849 A | 7/1996 | Burdick |
| 5,597,278 A | 1/1997 | Peterkort |
| 5,713,705 A | 2/1998 | Gruenbichler |
| 6,024,522 A | 2/2000 | Bainbridge et al. |
| 6,227,782 B1 | 5/2001 | Bowling |
| 6,238,155 B1 * | 5/2001 | Aukzemas .............. F16B 39/28 411/352 |
| 6,290,442 B1 | 9/2001 | Peterkort |
| 7,051,624 B2 | 5/2006 | Zbigniew |
| 2005/0126349 A1 * | 6/2005 | Trank .................... B25B 13/485 81/460 |
| 2014/0157840 A1 * | 6/2014 | Martinelli ........... F16L 55/1152 70/163 |
| 2014/0178147 A1 * | 6/2014 | Lin ....................... F16B 41/005 411/197 |
| 2023/0047865 A1 * | 2/2023 | Ivarsson ................ B60B 3/165 |

FOREIGN PATENT DOCUMENTS

| | | | |
|---|---|---|---|
| CN | 201027781 Y * | 2/2008 | |
| DE | 3713166 | 7/1994 | |
| EP | 0253496 | 1/1988 | |
| EP | 0243463 | 3/1990 | |
| EP | 0911468 | 4/1999 | |
| EP | 0982101 | 3/2000 | |
| EP | 2698552 A1 * | 2/2014 | ............ B62H 5/001 |
| JP | 3050542 | 6/2000 | |
| KR | 100380307 | 7/1999 | |
| KR | 100804000 | 6/2005 | |
| WO | WO-2006092284 A1 * | 9/2006 | ............ E05B 37/12 |
| WO | WO-2018101812 A9 * | 7/2018 | ............ B60B 7/16 |
| WO | WO-2020117696 A1 * | 6/2020 | |

\* cited by examiner

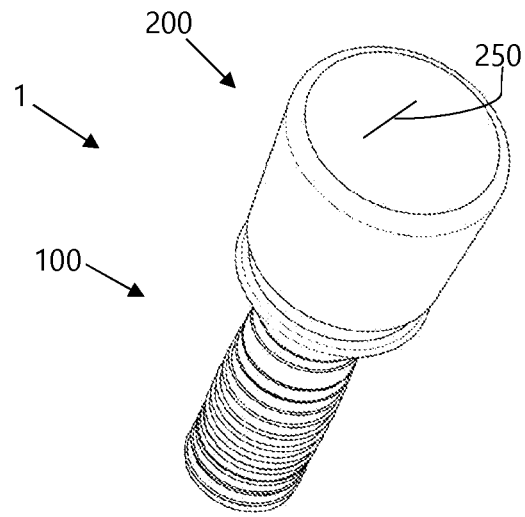
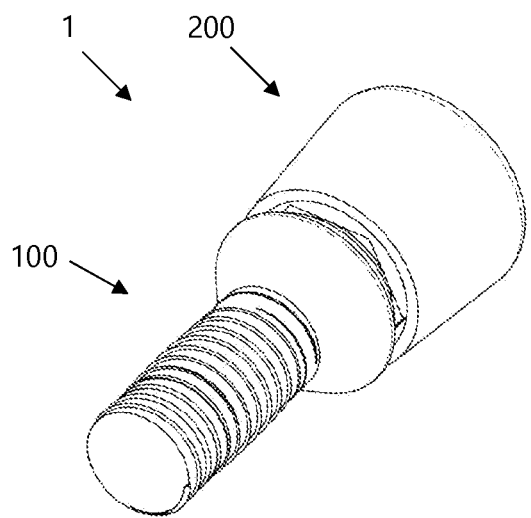
Figure 1AFigure 1B
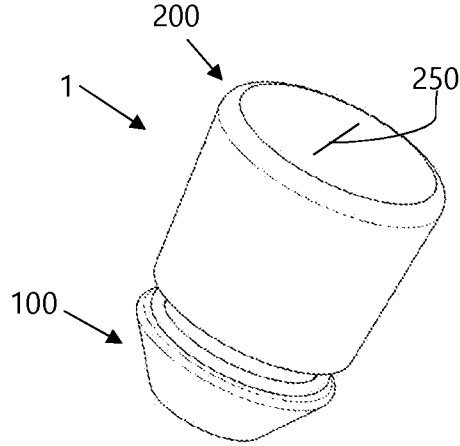
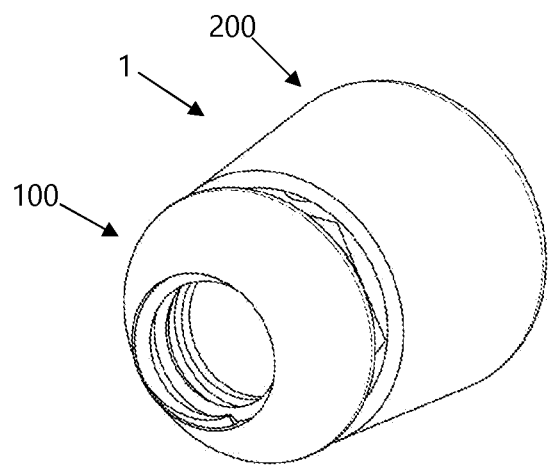
Figure 2AFigure 2B

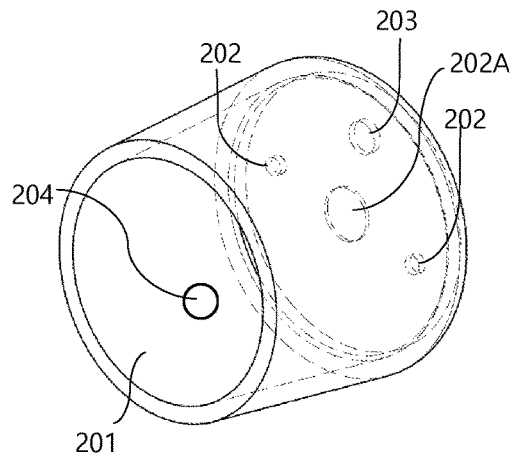
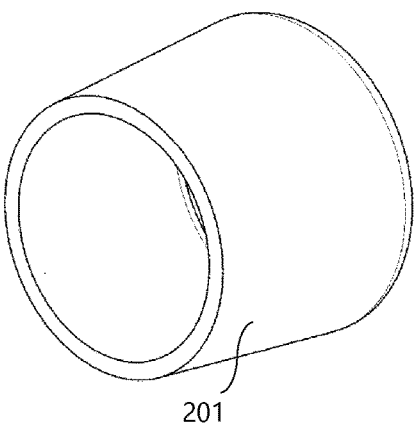
Figure 3B    Figure 3C
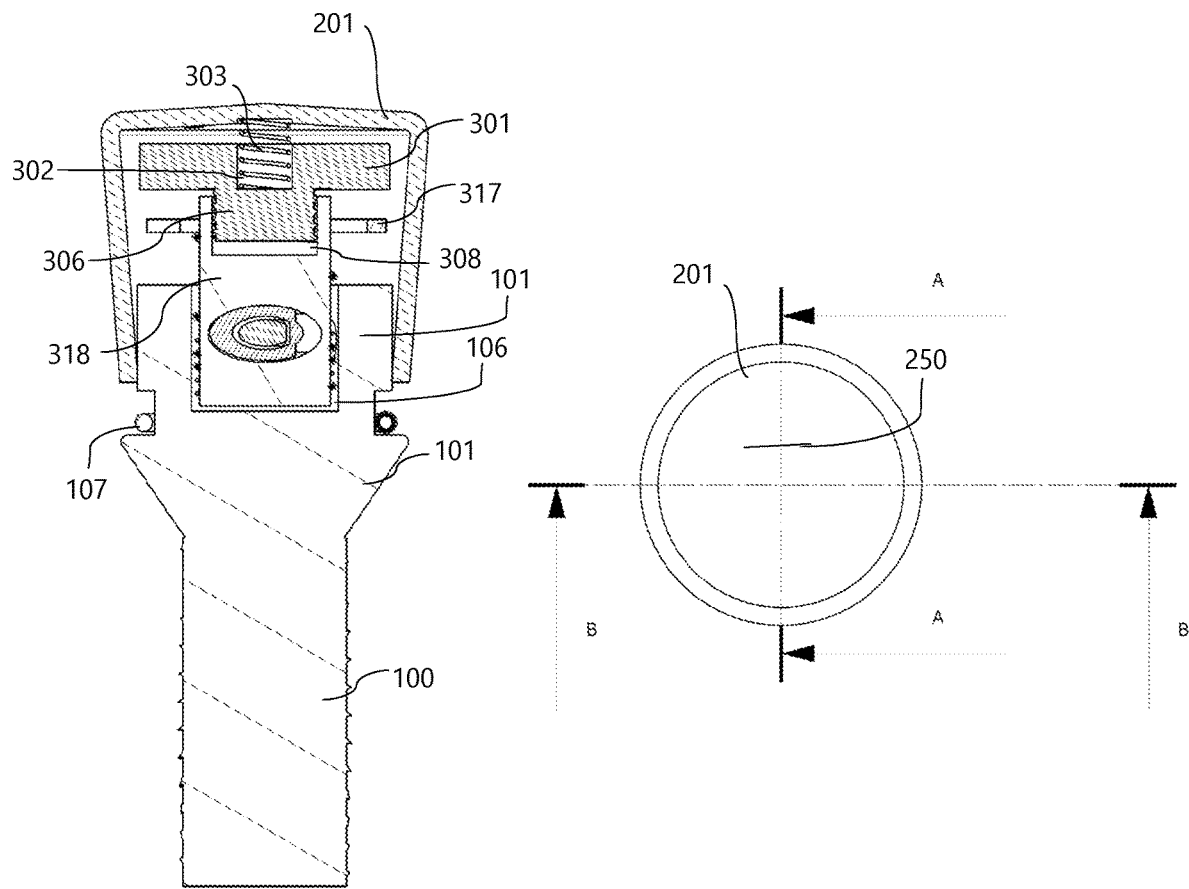
Figure 4

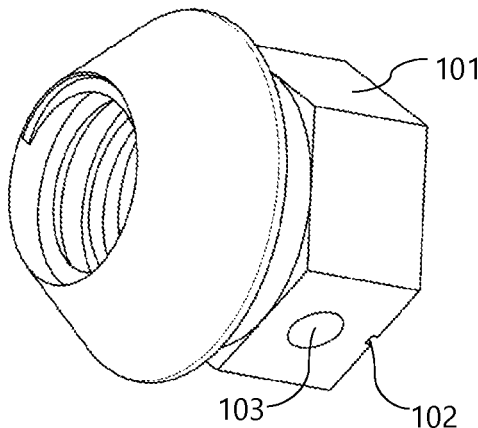
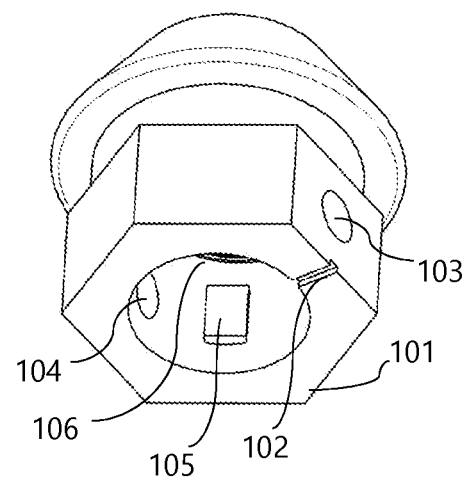
Figure 16A    Figure 16B
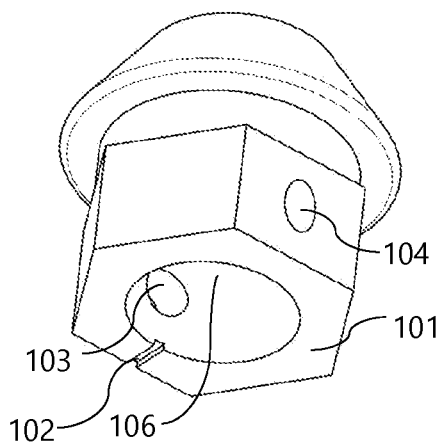
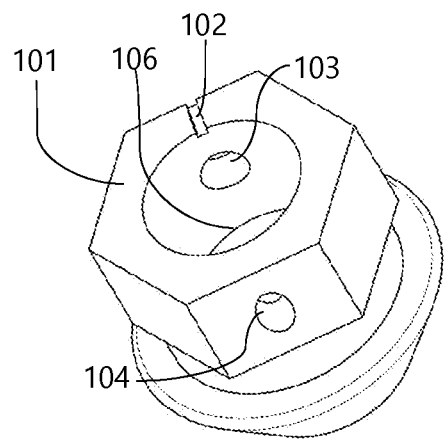
Figure 16C    Figure 16D
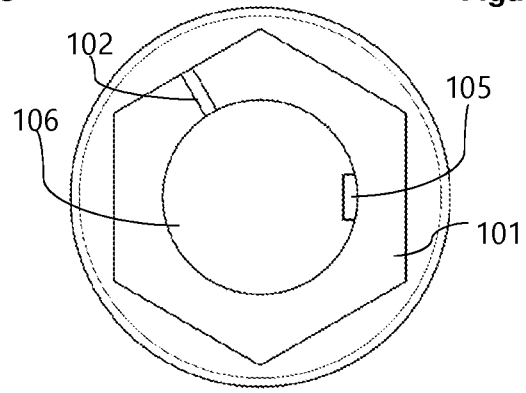
Figure 17

SAFETY DEVICE FOR A VEHICLE ROLLING DEVICE

CROSS REFERENCE TO RELATED APPLICATION

This application is a national stage entry of PCT/MX2019/000061 filed May 21, 2019, under the International Convention and claiming priority over Mexican Patent Application No. MX/a/2019/005377 filed May 8, 2019.

TECHNICAL FIELD

The present invention pertains to the technical field of mechanics, specifically to the devices implemented in an auxiliary way to increase the safety of parts of a vehicle, specifically to the field of external mechanisms of rolling device and still more specifically, the present invention relates to a security device for a vehicle rolling device.

BACKGROUND OF THE INVENTION

It is known that at present, that there is an important problem related to the theft of car components where people who perform this type of operations, without the consent of the owner, subtract parts of the vehicles for subsequent commercialization. One of the components with the highest index in theft of the same refers to the wheels with their respective rim, derived from easy access that people have to these when exposed and a variety of techniques of subtraction of the same, in addition to these often lack elements that increase their security, and in case of having these, itis easy for a criminal to perform maneuvers already known for this as the introduction of a tool that breaks the restraint device. In the same sense there are a variety of documents in the state of the art that provide technologies aimed at solving the aforementioned technical problems, such is the case of the U.S. Pat. No. 4,046,184A where reference is made to a series of safety devices to prevent the disassembly of low or flat tires, where a relatively simple safety system is mentioned to retain the tires, which are mounted on the wheels front of a heavy vehicle on the road, such as trucks, buses and the like, in the case of gradual or sudden deflation of the tires. These tires are subject to rims of two or three-piece types, mounted on discs or spoke wheels. The important and essential features of this invention lie in the provision of a radially extending locking lug mounted removably and firmly attached to a wheel radius or in the ventilation openings in the disc wheels and ending at its outer end in a position to contact the outer flange of a two-piece rim fitting, or in the case of a three-piece rim fitting, to contact the outer flange and to cover the radially divided locking ring. Thus, the tire and the flange are prevented from falling off the rim in two-piece rim constructions, and the flange, the tire and the locking ring are prevented from falling off the rim when deflating the tires mounted on the rims of three-piece rims. An embodiment of the invention also avoids the circumferential movement of the rim constructions and the tires mounted thereon.

Another document pertaining to the state of the art of the present invention is U.S. Pat. No. 2,684,710A, where reference is made to a bolt-operated tire bead loosening tool, wherein it consists of an elongated body that extends vertically and that has a hook head inclined angularly at its upper end, a tubular slider arranged angularly at its lower end extending in the same plane and substantially in the same direction with respect to said body; a coupling hook of the threaded rim slidably retained in said slider having a threaded fastening nut at its outer end and a hook for engaging an opening in a wheel disc at its inner end, the external portion of said head The hook is threaded to receive a force screw and its inner part is a channel guide that opens towards the lower end of said body, and has lateral flanks joined to an upper band with its lower and internal faces arranged in an angular manner with hooks for engaging the flange of a rim from which a tire is to be removed; a wedge block of force operating in a sliding manner in said channel guide having a front face arranged to rest on the side wall of a tire on said rim with a lower hook edge for engaging said flange in a manner coincident with said channel guides, when inserted into said guide channel; and a screw threaded on the outside of said hook head with its inner end rotatably connected to said force block, and having a tap head and wrench on its outer end, arranged to force said wedge block outward from said channel guide and forcing its front face against the side wall of a tire in said rim, while the hooks on said side flanks engage said rim.

In the same sense, European application EP0911468A1 refers to a sliding safety bolt, wherein said safety bolt comprises a body in which wrench is transmitted and where a control lever moves the wrench between the neutral and armed positions. The disarming device allows the wrench to move from the armed position to the neutral position. These devices comprise a slider which is transmitted in relation to the wrench by means of the control lever during the movement of the key to its armed position; U.S. Pat. No. 7,051,624B2 refers to a lock nut, screw and screw, wherein a screw security lock, for example. a nut or bolt having a head around which is a curved outer surface that is at least partially conical or dome-shaped on which several left-handed and right-handed slots are formed which are designed to receive a projection from an inner surface of a cooperation tool.

A nut or safety screw is described in the European application EP0253496A1 wherein a nut or bolt of the safety wheel for a road wheel of a vehicle has a main body provided with a polygonal transmission portion and wherein a sleeve is rotatably mounted in the main body to surround the drive part with clearance, the sleeve having the foot in the form of two projections extending axially inwards. A wrench has a socket that can be hooked with the transmission portion and has a cylindrical outer surface that fits within the space between the sleeve and the transmission portion, the wrench has axial recesses to receive the projections, in addition the safety can be improved providing three or more projections, with arcuate spaced coded between them, and using unit portions of different shapes and sizes.

Finally in the U.S. Pat. No. 6,024,522A reference is made to a safety fastener which includes a body having a circumferential periphery and an end wall, a curvilinear groove in the end wall, a plurality of circumferentially spaced recess extending towards within said circumferential periphery from said end wall and having a bottom wall and first and second side walls, as well as junctions having radii between the bottom wall and the side walls. One of the side walls extends at an angle greater than the axis of the fastener than the other side wall, which engages with the driving tool. A driving tool for actuating both the front safety lock and the conventional hexagonal lock including a body having an opening with a plurality of axially extending grooves for selectively engaging the side wall of the recess of the safety lock or a plurality of sides of the hexagonal fastener.

Documents which describe similar devices can be found in U.S. Pat. Nos. 3,241,408A, 4,747,202A, EP0982101B1, U.S. Pat. Nos. 3,874,258A, 5,597,278A, KR100804000B1, KR100380307B1, U.S. Pat. Nos. 6,227,782B1, 5,533,849A, 4,671,141A, 5,713,705A, 4,734,001A, 6,238,155B1, CA2172570C, U.S. Pat. Nos. 5,238,342A, 5,449,260A, EP0243463B1, AU685937B2, U.S. Pat. Nos. 5,020,949A, 6,290,442B1, JP3050542B1

The document found in DE3713166 (A1) refers to a device for preventing the theft of tires from motor vehicles, comprising a wheel screw to be used instead of a wheel, is known as the document closest to that of the present invention. production wheel screw and a threaded shaft having an external screw thread with M12×1.5 mm or M14×1.5 mm, with a symmetrically rotational thickened part around the geometric longitudinal axis of the wheel pin, with increasing diameter, which is seated when used in a recess complementary to the wheel rim, and having an annular end surface and with a head lying, seen from the external screw thread, on the other side of the thickened portion, which is smaller in terms of its circumference than the larger diameter of the thickened portion and has, on its circumference, engagement surfaces, parallel to the longitudinal axis, for the torque converter, whose device also comprises an adapter that can be loosely placed on the head of the wheel screw, with a hexagonal cap for fixing a torque tool whose wrench size is 17 mm or 19 mm, and with a lid edge covering the head of the pin wheel and on whose inner surface counter coupling surfaces are designed which are complementary to the hooking surfaces of the head, the outer circumference of the lid edge is considerably larger than the external circumference of the hexagonal cover, characterized in that:
   a) the application surfaces are the flanks of the teeth regularly distributed of an external toothing.
   b) the counteracting surfaces are the flanks of the teeth of a corresponding internal tooth.
   c) the external toothing and the internal toothing each have an identical number n of teeth, n being a number between 12 and 24 and the teeth having a height of between 0.5 mm and 3 mm,
   d) a runoff is provided for the dirt arranged in the toothing in the final region of the external toothing in front of the annular surface of the end,
   e) the wheel bolt has the same weight as the production wheel bolt.

The disadvantages found in the prior art occur mainly in that they have a variety of support points in which extreme elements can be inserted, which are widely known, such as wrenches, levers, rods, among others to perform some force that breaks the mechanism or protective part. Further the majority includes the use of some wrench specific of the tool or security device for using during the adjustment thereof, which forces the user to always having to carry an auxiliary element. for the withdrawal of the same and gives offenders the possibility of generating a copy.

The above results in notorious disadvantages for the user, in as much the problem of not ensuring a comprehensive integrity of the wheel is initially preserved, followed by a need to carry an opening tool for the adjustment of the bolt or nut. In case of having more than one device per wheel, the amount of tooling that must be carried with it at the time of an eventual exchange or maintenance is increased.

For these reasons there is a need to have a device that provides the possibility of raising the safety of the wheel or rim, to avoid its subtraction, in conjunction with its rim, without neglecting user-friendliness whereby the user should have at all times the control of said security device.

Therefore, the present invention has the task of presenting a device that resolves the above-described drawbacks and provides significant advantages in its utility, since it is a safety device for vehicle rolling means, of similar characteristics to those described in the aforementioned documents, with a series of components in their structure that allow easy and simple manipulation of the same, without neglecting at a certain time the safety of both the device and the rolling medium where it is placed.

BRIEF DESCRIPTION OF THE INVENTION

It is therefore a main object of protection, a safety device for vehicle rolling means that is inserted in the reception-cavity for bolts or nuts of a rim of an automotive vehicle that comprises a fixing unit which can be defined both by a bolt and by a nut as well as a mechanism for closing and opening which has in its interior a synchronized locking and opening arrangement characterized in that the fixing unit comprises a preferably metallic piece, which can have either a bolt configuration or nut configuration, wherein in the bolt configuration it comprises a head that in its lower part has an extrusion of a globally cylindrical shape that has a rib on its periphery, which is threaded for screwing into the portions of the vehicle's rim arranged for said action; whereas for the nut configuration, the head has a drilling on its axial axis which in turn has a rib that is screwed into the screw that is arranged in the body of a vehicle for fixing the rolling medium, in either of the two configurations, while the closing and opening mechanism primarily comprises a main casing that has a globally cylindrical shape, hollow in an interior thereof, and that internally houses a combination core that comprises of a core head and a core extension

BRIEF DESCRIPTION OF THE FIGURES

FIG. 1A shows a perspective view of the security device for a vehicle rolling device.

FIG. 1B shows a side view of the security device for a vehicle rolling device.

FIG. 2A shows a perspective view of a closing and opening mechanism of the security device for a vehicle rolling device.

FIG. 2B shows a side view of the closing and opening mechanism of the security device for a vehicle rolling device.

FIG. 3B shows a view of a main casing of the closing and opening mechanism.

FIG. 3C shows an isometric view of the main casing.

FIG. 4 shows a sectional view of the security device for a vehicle rolling device.

FIG. 16A shows an isometric view of the fixing unit (100) of the security device for a vehicle rolling device. (1).

FIG. 16B shows an isometric view of the fixing unit (100) of the security device for a vehicle rolling device. (1).

FIG. 16C shows an isometric view of the fixing unit (100) of the security device for a vehicle rolling device. (1).

FIG. 16D shows an isometric view of the fixing unit (100) of the security device a of vehicle rolling device. (1).

FIG. 17 shows a top view of the fixing unit (100) of the security device for a vehicle rolling device. (1).

DETAILED DESCRIPTION OF THE INVENTION

Figure 3A:
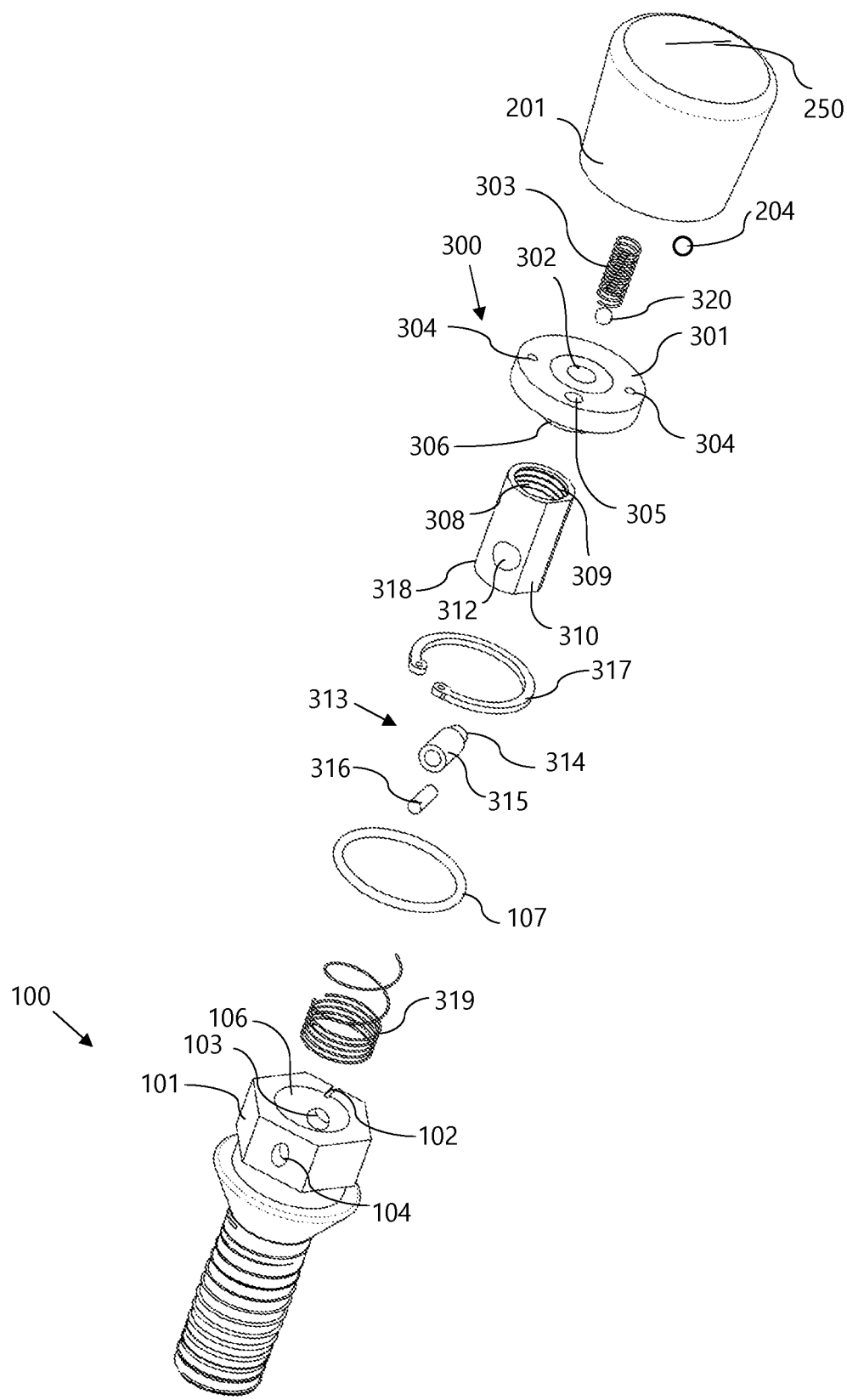
FIG. 3A shows an exploded view of the security device for a vehicle rolling device.

The present invention refers to a security device for a vehicle rolling device (1), which is manufactured in order to increase the level of safety for the prevention of removal of a rolling medium of a motor vehicle as it can be a compact vehicle, medium, pick up, among other segments of vehicles, where said device is composed of a series of components that as a whole and in their interaction obtain the solution to said problem, without neglecting the facility of operation as well as the low level of effort that has to be done to achieve its extraction, which gives it the advantage of being operable by most people, even without being experts in the field. The mechanical components used are generally integrated by a fixing unit (100) which can be defined either by a bolt or by a nut as will be detailed later, where it performs the functions of a conventional bolt or nut each time that the application of the torsional torque for tightening the wheel of the vehicle is transmitted through it to achieve its fixation to the respective mass body in the suspension system of the vehicle; on the other hand it has a closing and opening mechanism (200), which inside has a configuration that in turn has a synchronization and unique combination to obtain the opening thereof.

For a better understanding of the security device for a vehicle rolling device (1) and the attached for better understanding, a list of the components with their reference to be identified is shown:

fixing unit (100)
head (101)
partial notch (102)
through-drilling (103)
oval drilling (104)
guiding extrusion (105)
partial drilling (106)
hermetic seal (107)
closing and opening mechanism (200)
main casing (201)
partial drilling (202)
medium drilling (202A)
rolling drilling (203)
rolling device (204)
combination core (300)
core head (301)
partial drilling (302)
primary biasing means (303)
partial openings (304)
rolling drilling (305)
retainer ring (317)
connection extension (306),
core extension (318)
partial drilling (308)
threaded rib (309)
flat surface (310)
chamfered edge (311)
combination drilling (312)
primary latch (313)
retention extension (314)
receiving extension (315)
secondary latch (316)
core biasing means (319)
expansion ring (317)
core rolling device (320)

The fixing unit (100) is composed of a preferably metallic piece where it can have either a bolt or nut arrangement, having that in the bolt configuration it is composed by a head (101) that in its lower part has an extrusion of a generally cylindrical shape, which at its periphery has a rib, which is screwed into the portions of the vehicle's rim arranged for said action; while for the nut configuration it has a globally conical body that connects to the upper part of the head (101) has a drilling on its axial axis which in turn has a rib that is screwed into the screw which is arranged in the body of a vehicle for fixing the rolling device. In either of the two configurations, the fixing unit defines a head (101) which has a preferably hexagonal cross section, which in its upper part has of a partial notch (102) of globally rectangular shape and serving as a positioning reference for the closing and opening mechanism (200), on the face coinciding with the partial notch (102) there is a through-drilling (103) of globally circular shape, wherein the axial axis of said drilling is perpendicular to the axial axis of the fixing unit (100). Opposite this through-drilling (103) there is an oval drilling (104) whose arrangement is perpendicular to the axial axis of the axial axis of the fixing unit. Finally for the fixing unit (100) there is a guiding extrusion (105) having a preferably rectangular cross section and protruding in an area proximal to the middle zone between the through-drilling (103) and the oval drilling (104). In the middle area of the fixing unit (100), there is a partial drilling (106) having a preferably cylindrical cross section, which is the site where the guiding extrusion is located inside, and where the closing and opening mechanism (200) is inserted. In the upper part of the fixing unit (100) there is also a hermetic seal (107) made of a polymeric material that has a ring shape and is adjustable to prevent the entry of external agents such as moisture and dust to the elements that are arranged inside the mechanism.

The closing and opening mechanism (200) comprises firstly a main casing (201) that has a globally cylindrical shape, hollow in its interior and that in the internal part at one end has at least a pair of partial drillings (202) which are generally circular in shape, arranged opposite each other inside the inner face of the casing and which are located in an area near the periphery thereof; in the central part there is a medium drilling (202A), which also has a globally circular shape and which has a dimension of at least two orders greater than the partial drilling (202). In the same sense it also has at least one rolling drilling (203) whose object is to be the means for receiving a rolling device (204) which is in contact with the bottom of the rolling drilling (203) where it is housed, as well as with the upper face of a core head (301); the main casing also has an indicator (250) on the flat surface which is horizontal or vertical and has the purpose of showing the location or position of the fixing unit (100) when the casing covers it since it is coincident with the partial notch (102) of the head (101).

In the lower part of the main casing (201) there is the insertion of a combination core (300) wherein this is composed of two main elements; first a core head (301) as well as a core extension (318), wherein the core head (301) is a body defined by a structure where a base is incorporated in a circular overall shape that in its upper face has a partial drilling (302) which has a cylindrical shape and whose axial axis is coincident with the axial axis of the core head (301) and whose diameter allows the insertion of a primary biasing means (303), which is preferably made of a metallic material and having a height of at least 5 mm, then has at least a pair of partial openings (304) where these have a globally circular shape and are coincident with the partial drilling (202) of the main casing (201). The core head (301) also has a rolling drilling (305) defined by a generally cylindrical drilling-type cavity, where a core rolling device (320) with globally spherical shape is insertable, wherein said insertion is incorporated up to the middle or equatorial zone of the core rolling device (320). At the opposite end of the face where the partial drillings (302) as well as the rolling drilling (305) are provided, there is a connection extension (306) having a body of globally cylindrical shape that in its periphery has a threaded rib (307) the latter operating for the insertion and coupling of the connection extension (306) with the core extension (318) and consequently the union of the core head (301) with the core extension (318).

The core extension (318) has a preferably cylindrical cross-section body defining in its central part and in coincidence with its axial axis, a partial drilling (308) that has a threaded rib in its interior (309) that connects to the threaded rib (307) of the core head. In its periphery it has an external diameter reducer formed by a flat surface (310) which in turn allows insertion in the guiding extrusion drilling (105) of the partial drilling (106) found in the fixing unit (100), wherein said entry is also assisted by a chamfered edge (311) at one end of the core extension, wherein said threaded termination is further coincident with the flat surface (310); perpendicular to the axial axis of the core extension (302) and in a zone proximal to the end where the threaded termination (302) is located, there is a combination drilling (312) having a preferably circular cross section wherein two components, identified as rockers, pins or lock/release latches, are received therein, wherein a primary latch (313) is composed of two parts, the first is a retention extension (314) of a body of generally cylindrical shape that at one of its ends has a receiving extension (315) of greater diameter than the first one retention extension (314) and that inside it has a partial hollow cavity, where a secondary latch (316) having generally cylindrical shape and of a smaller diameter than the aforementioned partial hollow cavity is received in the partial hollow cavity.

The rockers, pins or lock/release latches are retained inside the combination drilling (312) by a core biasing means (319) which has a body preferably having circular cross section containing two different thread pitches between the helixes forming it, wherein a thread pitch for the core biasing means portion (319) that is closest to the core head (301) is greater than a thread pitch in contact with the lateral sides of the lock/primary latches (313) within the combination drilling (312), such as to prevent the primary latch (313) and the secondary latch (316) from leaving of said drilling and its eventual mispositioning within the arrangement.

Finally, and in order to prevent the combination core from leaving the main casing (201), an expansion ring (317) is inserted, which has a partially circular shape with at least one pair of rounding terminations which, in its middle part, have a drilling which is used for the insertion of an auxiliary device that allows to reduce its diameter by applying a force which in turn allows entry into the interior of the main casing (201) and once inserted allows, with its eventual release, retaking its original diameter so as to have a permanent pressure against the internal wall of the casing and thus prevent the combination core from escaping, inasmuch as it abuts with the bottom side of the core head thereby preventing its escape.

In FIGS. 1A and 1B an isometric view of the security device for a vehicle rolling device can be seen, where the position of the closing and opening mechanism (200) coupled with the fixing unit (100), can be noted. Same applies to FIGS. 2A and 2B where these have the configuration where the fixing unit (100) is represented as a nut, while in the previous is a bolt.

Figure 5:
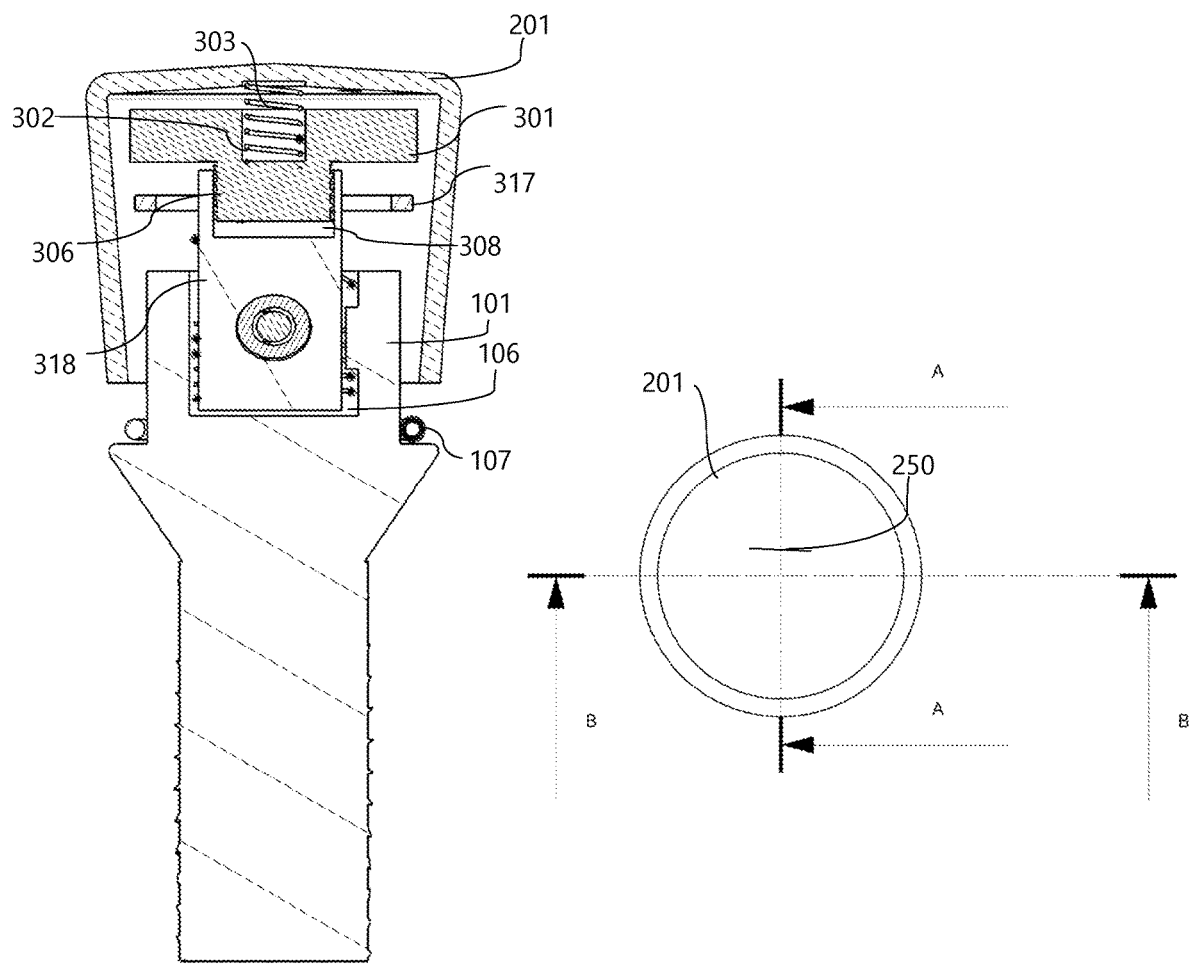
FIG. 5 shows a sectional view of the security device for a vehicle rolling device.

FIG. 3 illustrates the way in which the device object of the present invention is assembled, having its components in an exploded view and also having these assembled on the same axial axis, being coincident and keeping a defined position relationship by the location of the fixing unit (100) since this is the first to be inserted into the rolling device to which it is desired to increase safety. Likewise, FIG. 4 shows a sectional view of the device in which itis possible to see internally the way the elements present in the invention are arranged, this image in turn allows observing the proportions in which they are located. It is important to note that the primary biasing means has an essential function for operation in conjunction with the combination core, at the time of closure and opening which will be detailed later. The same applies to FIG. 5.

Figure 6:
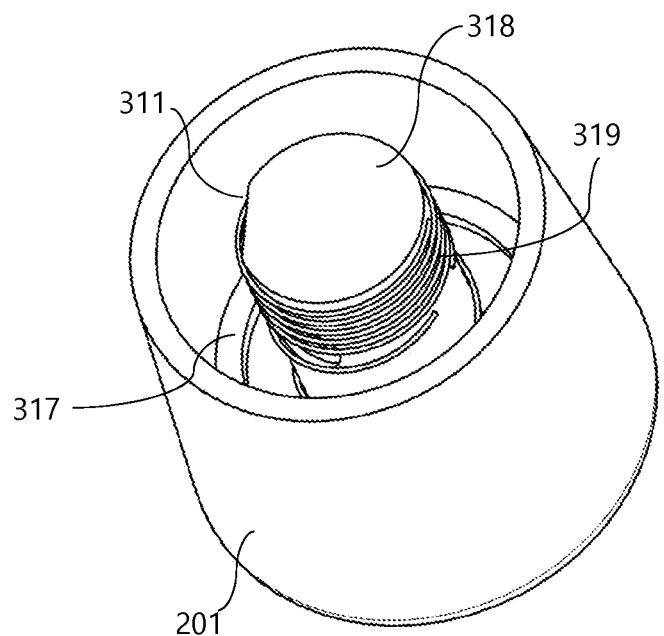
FIG. 6 shows an isometric view of the closing and opening mechanism of the security device for a vehicle rolling device with a core head and a core rolling device.
Figure 7:
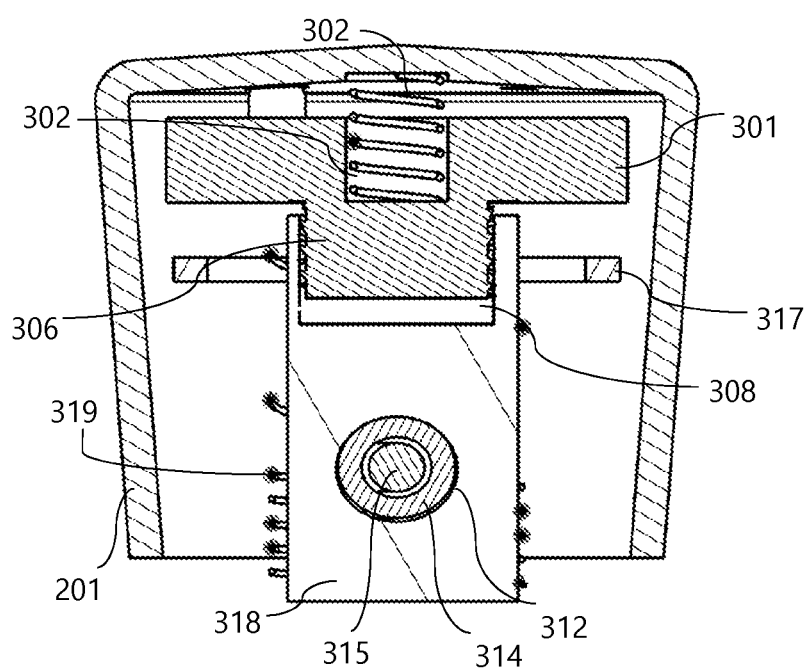
FIG. 7 shows a sectional view of the closing and opening mechanism of the security device for a vehicle rolling device in a driving position.
Figure 8:
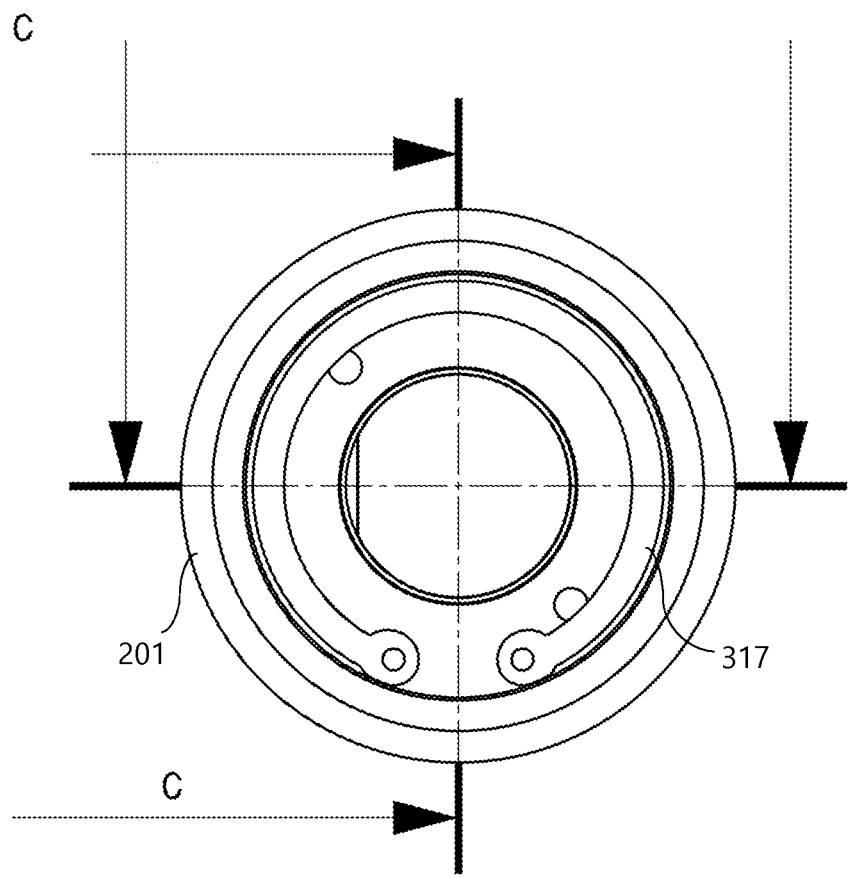
FIG. 8 shows a top view of the closing and opening mechanism of the security device for vehicle rolling device with a retaining ring in the securing position.
Figure 9:
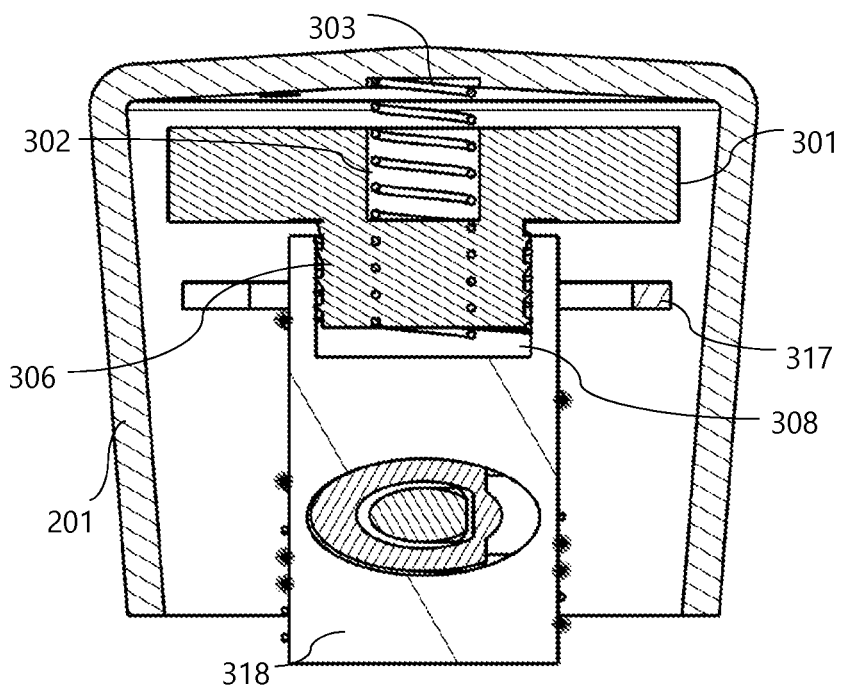
FIG. 9 shows a sectional view of the closing and opening mechanism of the security device for a vehicle rolling device in an operating position of the springs.

In FIG. 6 it is possible to identify how the core biasing means (319) has its fitting in the internal part of the closing and opening mechanism (200) and how the portion with less thread pitch in said biasing means (319) prevents the primary latch (313) and the secondary latch (316) from leaving; while in FIG. 7 a sectioned view of the closing and opening mechanism (200) is shown, in which the arrangement of the components inside the main casing (201) in the same direction can be seen. FIG. 9 shows a cut where it is possible to observe said fitting, although this cut is made at an angle of 90° with respect to the one shown in FIG. 7.

Figure 10A:
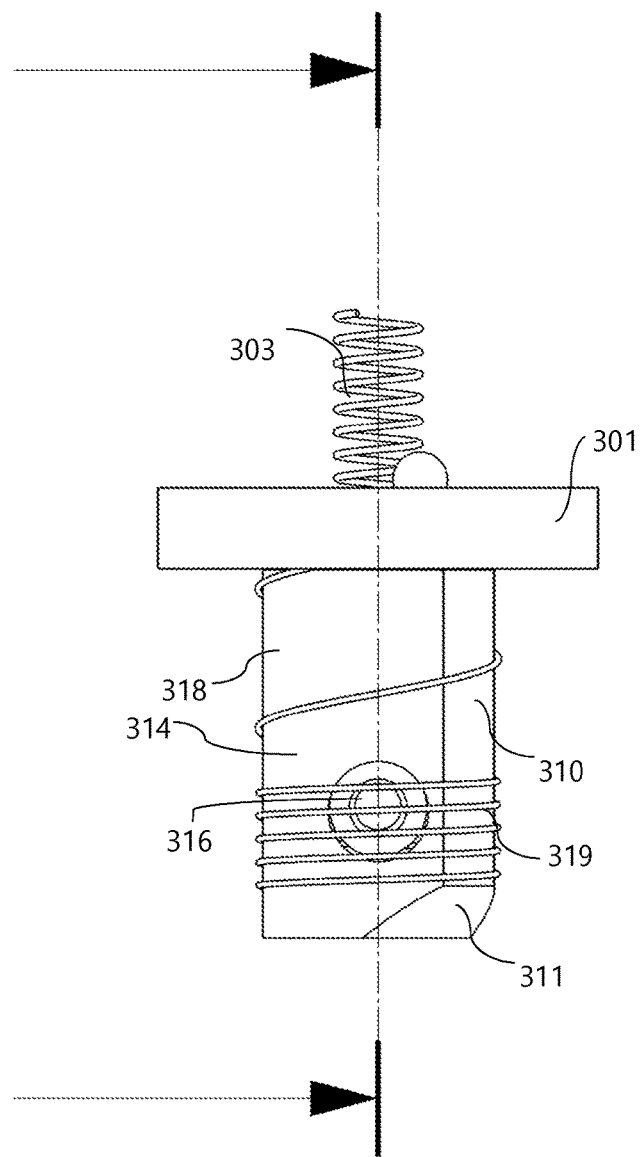
FIG. 10A shows a side view of the combination core of the security device for a vehicle rolling device.
Figure 10B:
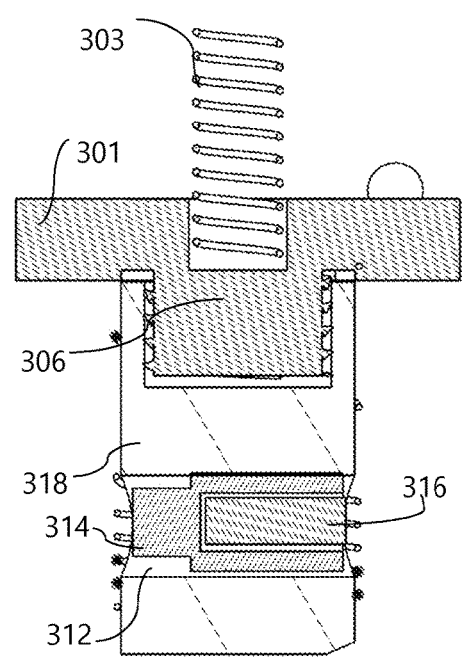
FIG. 10B shows a sectioned view showing the housing, the combination core and retainer ring of the security device for a vehicle rolling device.

FIGS. 10A and 10B show images of the combination core (300) where itis possible to determine the entry position of the primary latch (313) and secondary latch respectively into the combination drilling (312).

Figure 11:
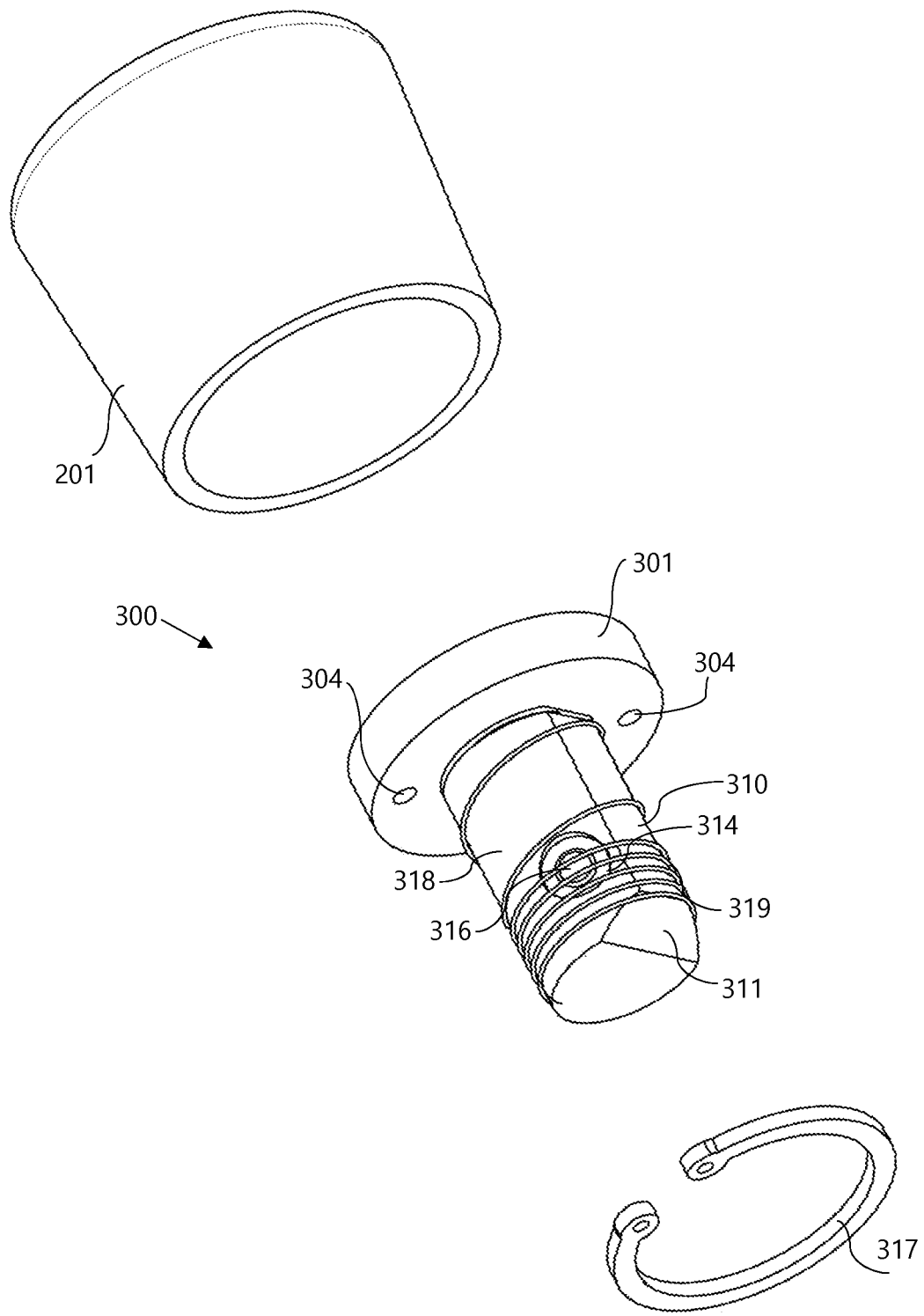
FIG. 11 shows an exploded view of the closing and opening mechanism of the security device for vehicle rolling device with the combination core.
Figure 12:
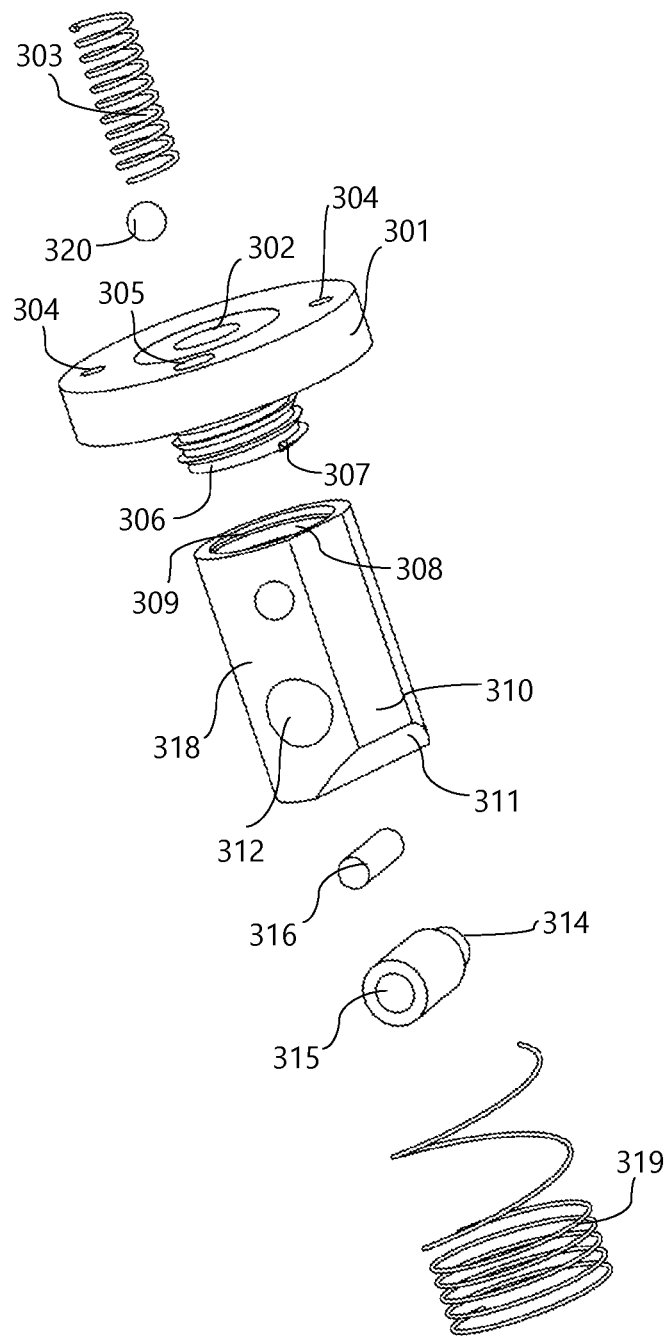
FIG. 12 shows an exploded view of the combination core (300) of the security device for a vehicle rolling device. (1).

In FIG. 11 an exploded view is shown where the elements of the main casing (201) and the combination core (300) are included, where way in which the core is inserted can be seen as well as the way in which the expansion ring (317) is inserted for retaining the combination core inside the main casing by coming into contact with its internal walls. FIG. 12 shows an exploded view where it is possible to observe the assembly of the pieces that interact with the combination core.

Figure 13:
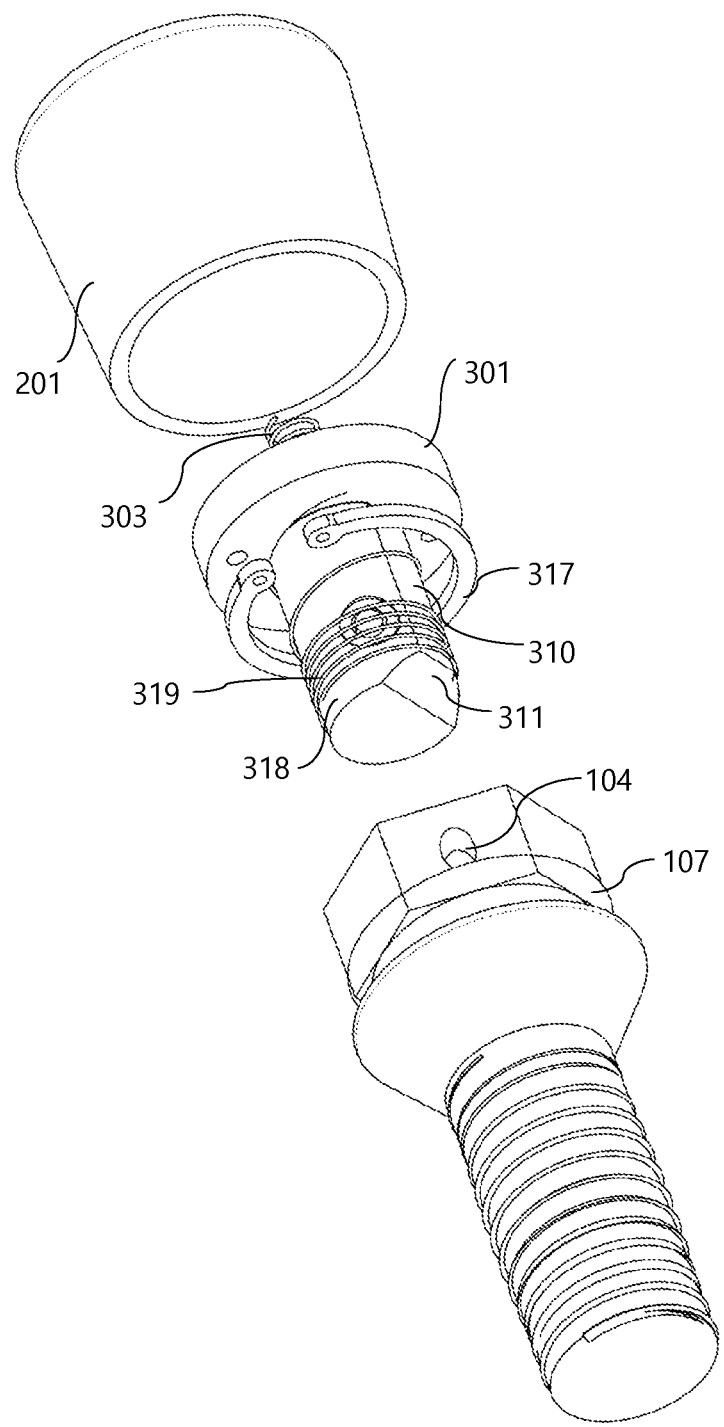
FIG. 13 shows an exploded view of the security device for a vehicle rolling device. (1).

FIG. 13 shows a view in which the assembly of the combination core (300) together with the main casing (201) and with the fixing unit (100) is seen, in this case having the bolt configuration.

Figure 14:
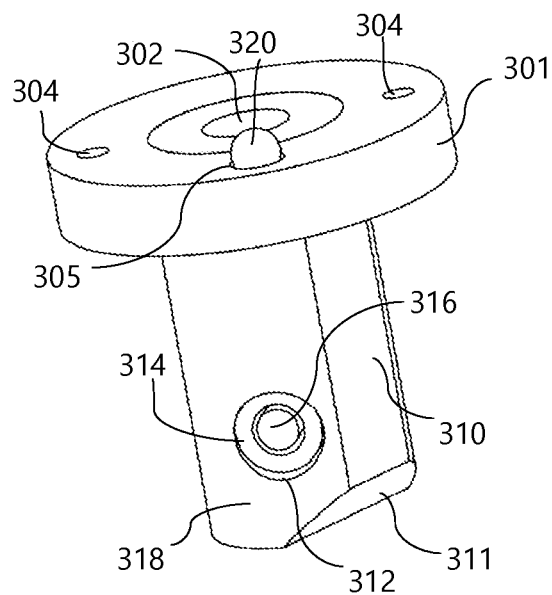
FIG. 14 shows an isometric view of the combination core (300) of the security device for a vehicle rolling device. (1).
Figure 15:
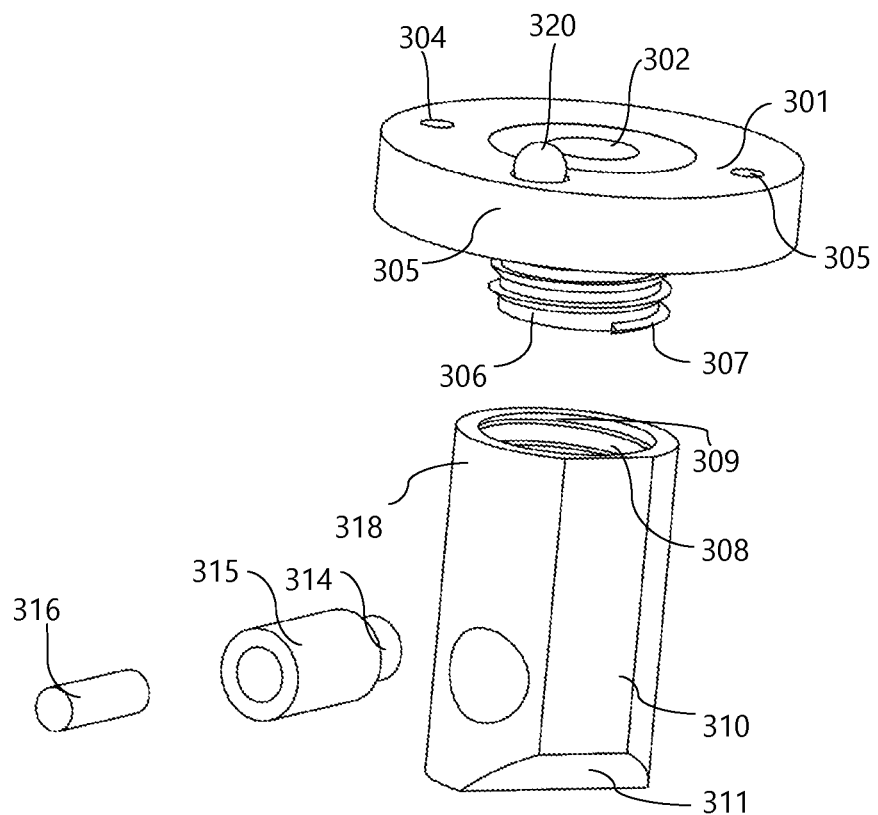
FIG. 15 shows an exploded view of the combination core (300) of the security device for a vehicle rolling device. (1).
Figure 18:
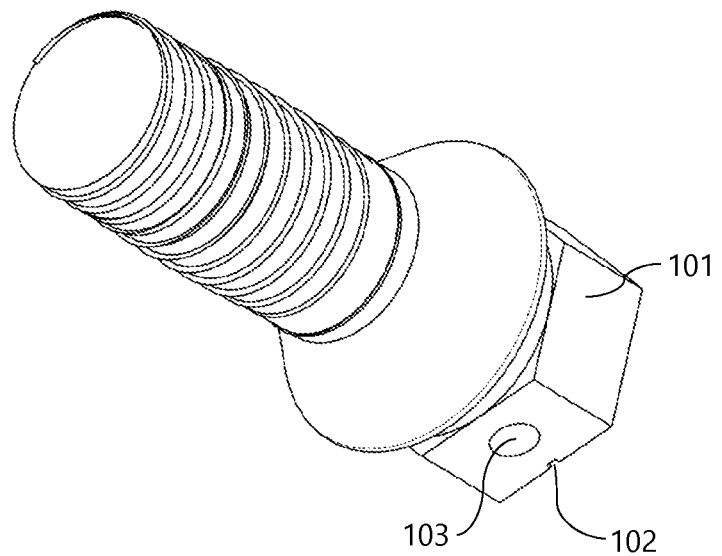
FIG. 18 shows an isometric view of the fixing unit (100) of the security device for a vehicle rolling device. (1).
Figure 19:
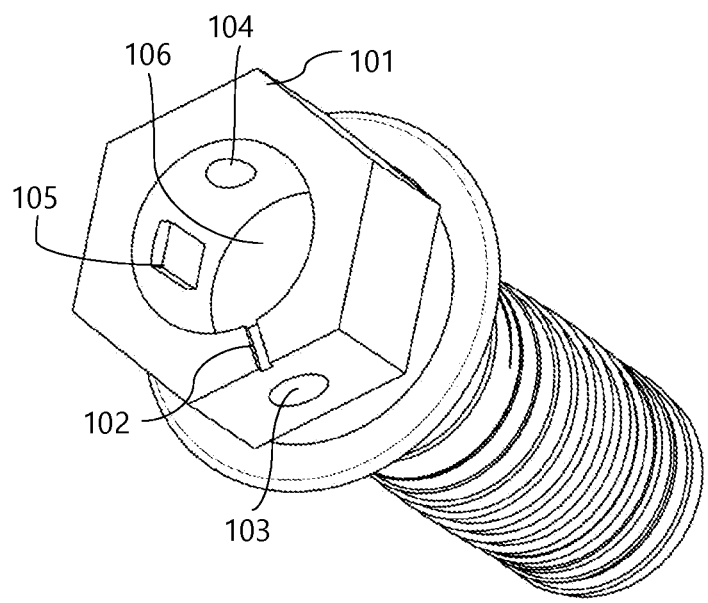
FIG. 19 shows an isometric view of the fixing unit (100) of the security device for a vehicle rolling device. (1).
Figure 20:
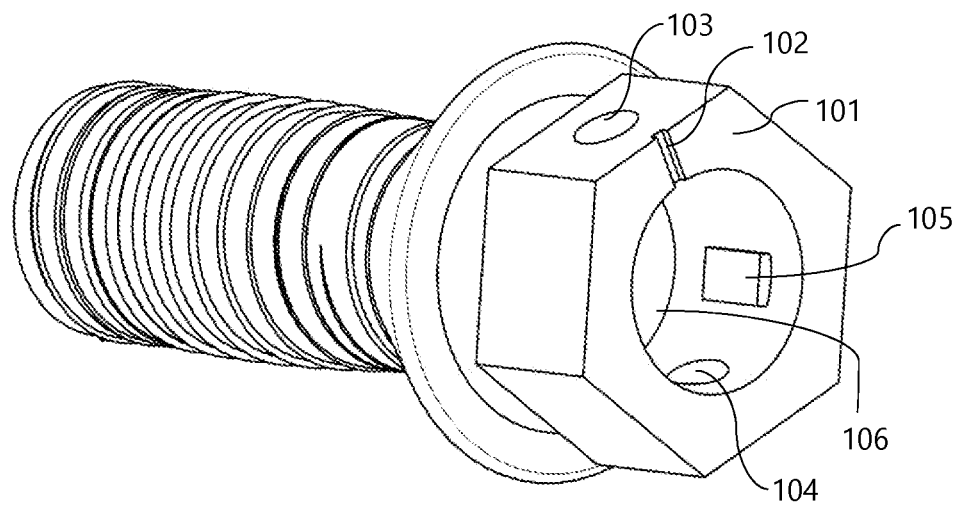
FIG. 20 shows an isometric view of the fixing unit (100) of the security device for a vehicle rolling device. (1).
Figure 21:
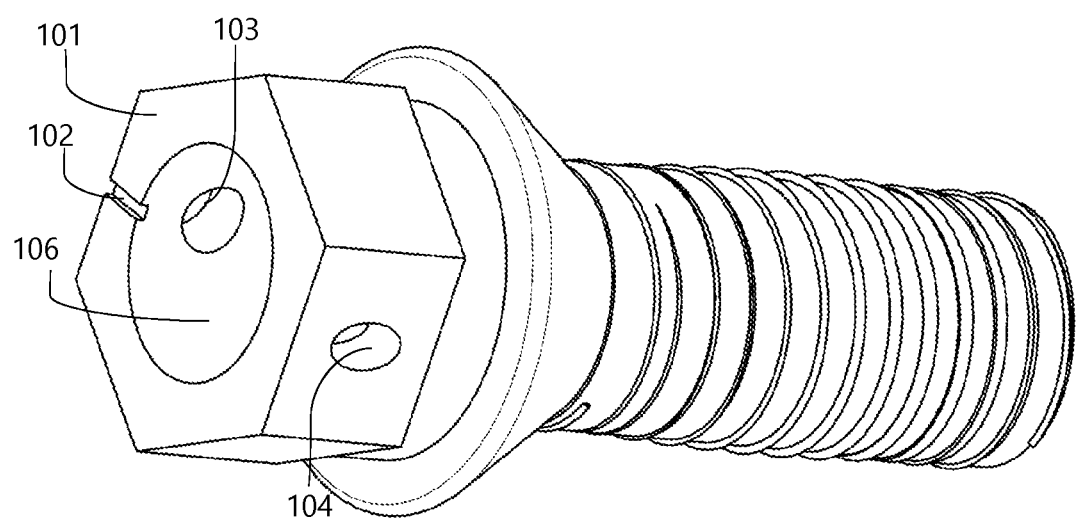
FIG. 21 shows an isometric view of the fixing unit (100) of the security device for a vehicle rolling device. (1).
Figure 22:
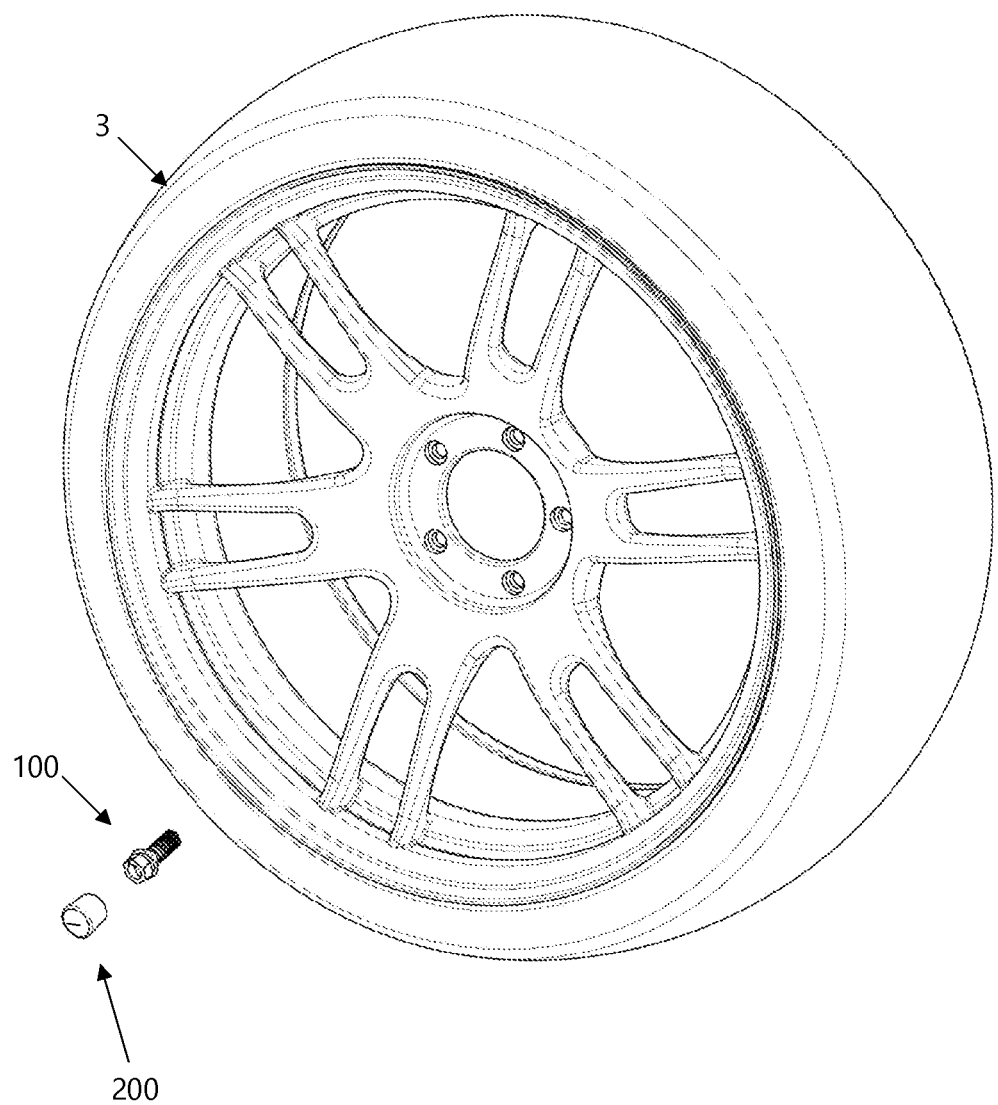
FIG. 22 shows an isometric view of the security device for a vehicle rolling device (1) coupled to a wheel (3) of a vehicle.
Figure 23:
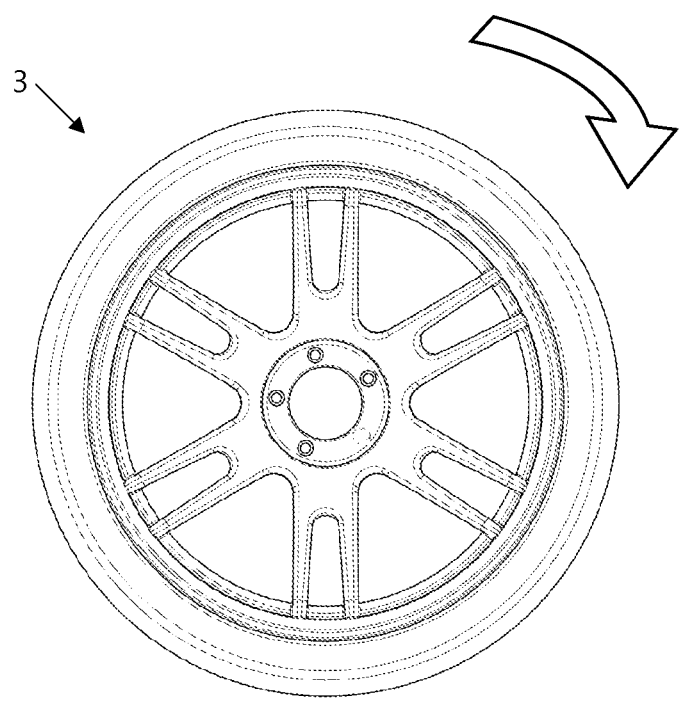
FIG. 23 shows a front view of the security device for a vehicle rolling device (1) coupled to a wheel (3) of a vehicle.
Figure 24:
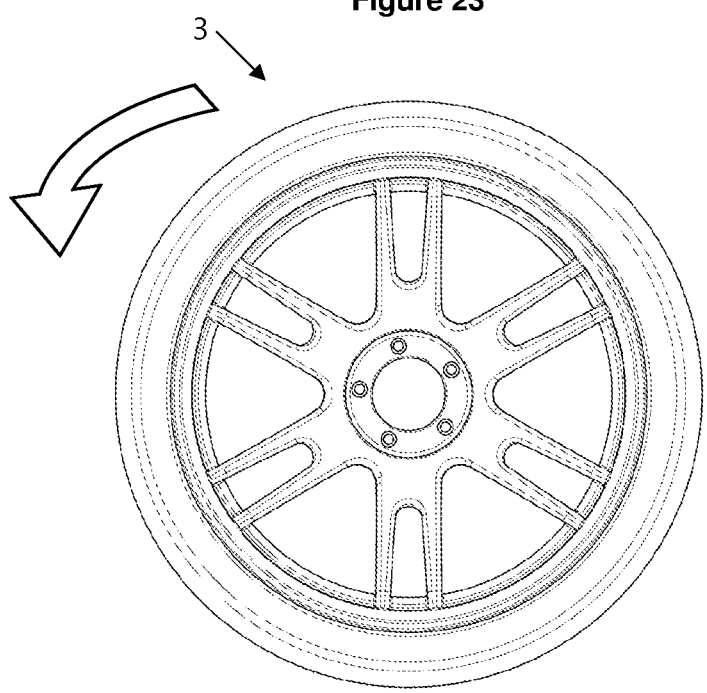
FIG. 24 shows a front view of the security device for a vehicle rolling device (1) coupled to a wheel (3) of a vehicle.

FIG. 14 shows an isometric view of the combination core (300) where it is possible to identify the flat surface and the chamfered edge (311) while in FIG. 15 an explosion of the combination core (300) is shown where the components that form it can be observed.

FIGS. 16A to 17 show different views of the mode of the fixing unit (100) where they have the nut configuration but keeping the elements of the head (101) that allow their coupling with the closing and opening mechanism (200). In the case of FIGS. 18-21, different views of the fixing unit in its bolt or screw configuration are shown.

The security device tor vehicle rolling device (1) object of the present invention has the main object of increasing the security level for an eventual subtraction of the wheel or rim of a motor vehicle. The way of using said device consists in having a wheel (3) of conventional vehicle having a plurality of drillings wherein the drillings generally pass through the middle cavity of the rim where they are located. Thus, firstly, the fixing unit (100) is inserted, which due to the arrangement of its head, wherein it has a generally hexagonal shape, it is possible to generate torque for its corresponding tightening through the insertion of an auxiliary wrench, as it is done in a conventional nut or bolt. Once the fixing unit (100) is coupled, the closing and opening mechanism (200) is inserted, such that upon entering, the core biasing means (319) has a negative path derived from its interaction with the upper part of the head (101), since its diameter does not allow said core biasing means (319) to enter, wherein the retaining extension (314) and the secondary latch (316) housed in the combination drilling (312)) are not prevented from leaving said opening and staying in the cavities of the through-drilling (103) and the oval drilling (104). In this way, their retention is achieved regardless of the rotation of the casing since these will remain in their position until their eventual release, which is achieved by applying an external pressure to the main casing as well as a turning until a fitting sit of the rolling device (204) arranged on the internal flat face of the main casing (201) when it comes in contact with the core rolling device (317) arranged in the upper part of the core head (301) is achieved. That is why in the front wall of the main casing there is an indicator (250) which allows identifying the position of the primary latch (313) in conjunction with the retention extension (314) and the receiving extension (315). In the same sense it is important to point out that for the release of the closing and opening mechanism it is inevitable to raise the portion of the body where said bolt is as well as the respective liberation of the brake that prevents its rotation, since the combination to return to his place of origin to the primary latch (313), the extension of retention (314), the receiving extension (315) and the secondary latch (316), namely the combination drilling (312) depends on the rotation of the wheel where they are located, since in a preferred embodiment of the invention a preferential rotation of between 150° and 190° with respect to the origin of the wheel must be carried out in order to achieve first the secondary latch return, then a pressure is made on the main casing to move the core biasing means (319) and that this first traps the retention extension (314) in the combination drilling (312). Subsequently a new turn is made to the original position where a lower pressure is made with respect to the first pressure, such that the secondary latch (316) is returned to the cavity of the receiving extension (315). A smaller force is made due to the existence of a smaller cavity due to the way in which the drilling is arranged, that is to say due to the oval drilling (104). Otherwise, that is to say if a force of equal magnitude to the first is implemented, a new fall of the retention extension (314) is caused, which then deviates from the combination drilling (312) upon leaving, so that the oval drilling prevents its fall and allows the core biasing means to trap the secondary latch (316) again and thereby achieve its escape.

In case of forgetting the combination that releases the latches of the grooves in the fixing unit (100) there is at least a pair of partial drillings (202) located on the inner face of the main casing, wherein these are in coincidence with the partial openings (304). The partial drillings have a thinner wall than the rest of the fixing unit (100), therefore itis possible to perform the insertion of auxiliary tooling in order to completely clear the partial drilling (202) whose knowledge and position is only known by the user from the position of the indicator (250) and could be in any area of the internal face of the main casing (201). Once those openings are released, a pressure tool is inserted and they are released together with the partial openings (304) of the combination core (300).

Although the foregoing description was made considering the preferred embodiments of the invention, it should be borne in mind by those skilled in the art that any modification of form and detail will be within the spirit and scope of the present invention. The terms in which this report has been written should always be taken in a broad and non-limiting sense. The materials, form, and description of the elements, will be susceptible of variation if it does not suppose an alteration of the essential characteristic of the model.

The invention claimed is:

1. An anti-theft security device for attaching to a rim of a vehicle wheel on a body in a suspension system of a vehicle, wherein the rim and the body have openings configured to receive at least one of said security device, the anti-theft security device comprising:
   a fixing unit (100) configured as a bolt or nut, to which a torque is applied for tightening the wheel of the vehicle and fixing with the body in the suspension system of the vehicle, wherein said fixation unit (100) comprises:
   a central screw having an elongated cylindrical body with an external thread configured to be inserted in at least one of the openings of the rim of the wheel and of the vehicle hub,
   a head of a conical shape at one end of the cylindrical body of said screw, the conical head having a flat upper surface, of which, in a central part protrudes a circular projection directed upwards and on which a nut is integrally arranged,
   wherein a neck is formed between the conical head and the nut;

wherein the nut has a body defining vertical walls with a hexagonal shape, wherein the nut has a central drilling projected inward up to the flat surface of the conical head forming a circular cavity, wherein a through drilling (103, 104) is formed in each one of the walls of the nut, the through drillings being aligned with each other, parallel to the flat surface of the conical head; and a closing and opening mechanism (200) tightly fixable on the vertical walls of the nut, said closing and opening mechanism (200) comprises:

a hollow main casing (201) having a closed upper end and a lower end with an open peripheral edge, wherein the lower end has a diameter smaller than a diameter of the closed upper end;

wherein the main casing (201) has a globally cylindrical shape and at least a pair of partial drillings (202) generally circular in shape in art internal part at one end thereof, at least a pair of partial drillings (202) are arranged opposite to each other inside the inner face of the main casing (201) located in a peripheral area thereof, wherein a central part of the main casing (201) comprises a medium drilling having a globally circular shape and having a dimension at least two orders greater than the at least a pair of partial drillings (202), wherein the main casing (201) further comprises at least one rolling drilling (203) for receiving a rolling device (204) therein, such that the rolling device (204) is in contact with a bottom of the rolling drilling (302), wherein the main casing (201) further comprises an indicator (250) on a flat surface thereof for showing a location or position of the fixing unit (100) when covered by the main casing (201), wherein the indicator (250) is coincident with a partial notch (102);

a core (300) received within the main casing, said core (300) comprising:

a core head (301) defining a circular body having an upper surface with a partial drilling (302) in a central part thereof, wherein said partial drilling (302) is configured to receive a primary spring (303); as well as a core extension (318) defined by a body of cylindrical cross section defining in a central part and in coincidence with an axial axis, a partial drilling (308);

wherein the core head (301) comprises at least a pair of globally circular partial openings (304) coincident with the at least a pair of partial drillings (202) of the main casing (201) and a rolling drilling (305) defined by a generally cylindrical drilling-type cavity, wherein a core rolling device (317) with globally spherical shape is inserted into the rolling drilling (305) up to the equatorial zone of the core rolling device (317);

wherein the core head (301) further comprises a connection extension (306) having a body of globally cylindrical shape with a threaded rib (307 in a periphery thereof for inserting and coupling the connection extension (306) into/with the core extension (318);

wherein the core extension (318) has a threaded rib (309) in an interior thereof that connects with the threaded rib (307) of the core head, wherein the core extension (318) has in a periphery thereof an external diameter reductor formed by a flat surface (310) allowing insertion in a guiding extrusion (105) drilling of a partial drilling (106) located in the fixing unit (100), wherein said insertion is also assisted by a chamfered edge (311) at one end of the core extension (318); and wherein the core extension (318) comprises a drilling (312) arranged perpendicular to an axial axis of the core extension (318) proximal to the end in which the partial drilling (302) is located, wherein the combination drilling (312) has a preferably circular cross-section, wherein a first latch (313) and a second latch (316) are received therein, wherein the first latch (313) comprises two portions, the first portion being a retention extension (314) comprising a body of generally cylindrical shape having at an end thereof a receiving extension (315) of greater diameter than the retention extension (314) and having in an interior thereof a partial hollow cavity, wherein the second latch (316) having a generally cylindrical shape and of a smaller diameter than the partial hollow cavity is received in said partial hollow cavity, wherein the first and second latches (313, 316) are retained within the combination drilling (312) by a core biasing means (319) having a body of preferably circular cross section and having two different thread pitches between the helixes forming it, wherein a thread pitch for the core biasing means portion (319) that is closest to the core head (301) is greater than a thread pitch in contact with the lateral sides of the first and second latches (313, 316) within the combination drilling (312), such as to prevent the first latch (313) and the second latch (316) from leaving the combination drilling (312) and its eventual mispositioning within the arrangement;

wherein the rolling device (304) can contact the core rolling device (317) by turning the main casing (201).

2. The security device according to claim 1, further including a ring-shaped seal (107) tightly arranged on the periphery of the neck formed between the conical head and the hexagonal nut, wherein said ring prevents entry of external agents such as humidity and dust.

3. The security device according to claim 1, further including a rectangular notch (102) located above one of the openings formed in one of the faces of the hexagonal body of the nut, said partial notch (102) serving as a reference for the placement of the closing and opening mechanism (200).

4. The security device according to claim 1, wherein said primary spring is made of a metallic material and has a height of at least 5 mm.

5. The security device according to claim 1, wherein an auxiliary key is used to generate the torque of the fixing unit.

* * * * *